(No Model.)
E. WAYLAND.
FLOWER STAND.
No. 419,484. Patented Jan. 14, 1890.
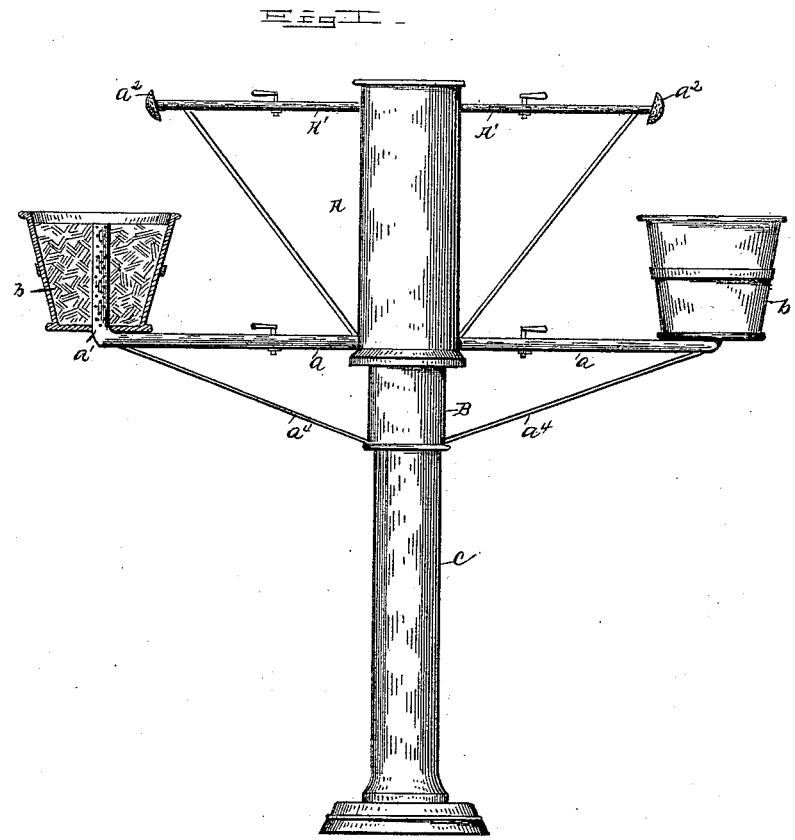
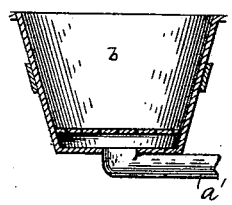
Witnesses
Inventor
Eli Wayland
By his Attorneys

United States Patent Office.

ELI WAYLAND, OF MONROE CITY, MISSOURI.

FLOWER-STAND.

SPECIFICATION forming part of Letters Patent No. 419,484, dated January 14, 1890.

Application filed September 25, 1889. Serial No. 325,023. (No model.)

*To all whom it may concern:*

Be it known that I, ELI WAYLAND, a citizen of the United States of America, residing at Monroe City, in the county of Monroe and State of Missouri, have invented certain new and useful Improvements in Flower-Stands, of which the following is a specification, reference being had therein to the accompanying drawings.

My invention pertains to an improvement in flower-stands; and it consists in the peculiar construction, combination, and arrangement of the parts, substantially as hereinafter more fully shown and described.

The object of my invention is to produce a highly ornamental revoluble or stationary and movable flower-stand as a receptacle for flowers, irrigated to enhance their growth and beauty; and it consists in the peculiar construction, combination, and arrangement of the parts, substantially as hereinafter more fully described.

In the accompanying drawings, Figure 1 represents a part side elevation and part sectional elevation of my invention. Fig. 2 is a modification thereof.

In constructing my flower-stand I provide a suitable central reservoir A, disposed upon a cylinder B, rigidly secured thereto, which is designed to telescope and rotate upon post C. Reservoir A has opening therein and radiating therefrom a series of tubes or pipes $a$, whereon are rigidly secured by any ordinary means a corresponding series of flower vases or receptacles $b$, for flowers planted therein. Tubes or pipes $a$ project through and above the bottom of pots or vases $b$, and are provided with a suitable number of fine apertures $a'$ in their periphery to admit gradual outflow of water upon the surrounding earth or flowers in the pots, as shown, and also each tube or pipe is provided with any ordinary valve or stop-cock for regulating the passage of the water therein, or for admitting its flow and causing stoppage thereof.

The flower pots or vases $b$, which may be made of any suitable material, have provided in the bottom thereof, immediately above the upper ends of tubes $a'$, a series of very small apertures to admit outflow therefrom of a suitable supply of water from reservoir A, without departing from the spirit of my invention.

The tubes or pipes $a$ are securely held in position by means of braces $a^4$, to which and cylinder B they are rigidly secured. There also radiates from reservoir A to each flower-pot, at any suitable altitude, a corresponding series of tubes or pipes $A'$, terminating in disk-sprinklers $a^2$, perforated outwardly, which are designed to spray the water upon the flowers, as shown, and these tubes or pipes are each provided with an ordinary valve or stop-cock for controlling the passage, also the quantity of water sprinkled or sprayed upon the flowers. Thus it will be seen that reservoir A, cylinder B, tubes or pipes $a$ $A'$, and flower pots or vases $b$ are integral, and that as cylinder B is disposed upon post C the flower-pots may be readily and conveniently rotated for obvious purposes, and that the flower-stand may, thus disposed, be conveniently replaced upon post C outdoors, as occasion may require.

My flower-stand thus constructed admits gradual supply of water to the flowers and, sprinkling or watering them at their roots, aids the growth of the plants. It also admits of their being readily rotated or removed, as aforesaid, and is in all respects beautiful and highly ornamental. It will also be observed that by use of the stop-cocks the sprinkling and root-watering operations may be alternated or rendered simultaneous, as desired.

Having thus fully described my invention, what I claim, and desire to secure by Letters Patent, is—

A flower-stand consisting of a central reservoir disposed upon a cylinder designed to telescope upon a post or stand, having an upper and lower series of pipes radiating therefrom for irrigating the soil and sprinkling the flowers, the upper series of pipes terminating in disk-shaped sprinklers disposed above the pots, and the lower series terminating in perforated cylinders projecting vertically in and above the bottom of the pots, substantially as shown and described.

In testimony whereof I affix my signature in presence of two witnesses.

ELI WAYLAND.

Witnesses:
JOHN T. LIGHTER,
R. B. BRISTON.